Aug. 21, 1934.   G. A. LYON   1,971,161
METHOD OF FORMING TIRE COVER STRUCTURE
Filed June 8, 1931
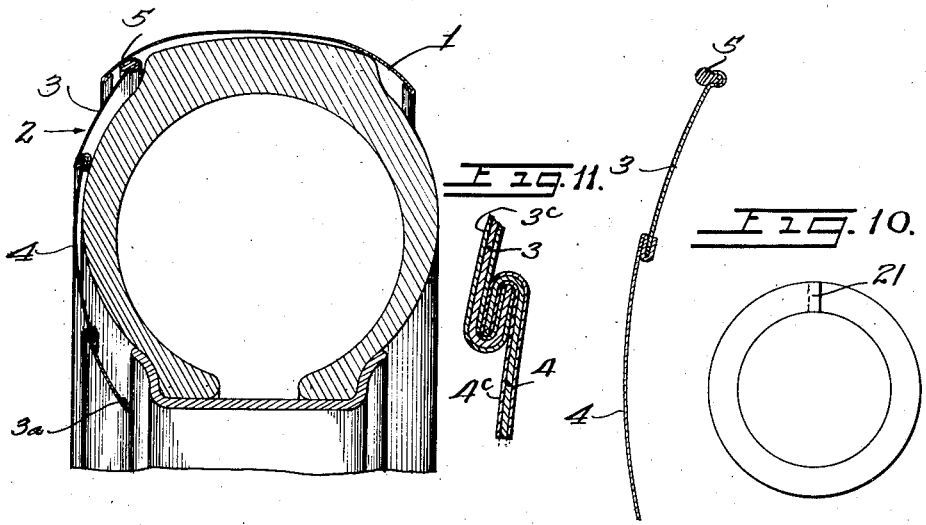
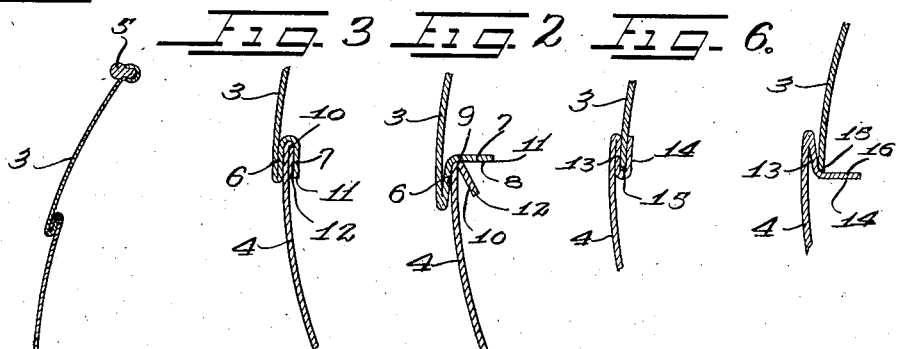
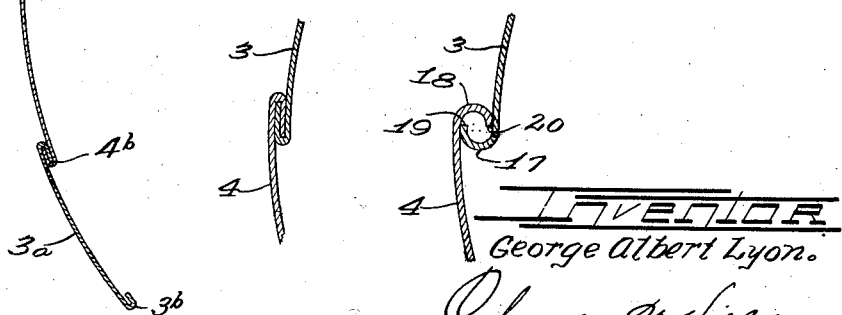
Inventor
George Albert Lyon.
by- Charles ...
Attys.

Patented Aug. 21, 1934

1,971,161

UNITED STATES PATENT OFFICE 1,971,161

METHOD OF FORMING TIRE COVER STRUCTURE

George Albert Lyon, Allenhurst, N. J., assignor to Lyon Incorporated, Asbury Park, N. J., a corporation of Delaware Application June 8, 1931, Serial No. 542,793

5 Claims. (Cl. 113—116)

This invention has to do with tire covers, and concerns itself more particularly with the construction of a multi-part tire cover side plate, for covering a side wall of a tire.

Inasmuch as the side plate has heretofore been made in one piece from a square sheet of metal, it has required complicated press operations as a result of which the cost of its manufacture is quite high, and has incurred a great amount of waste of metal.

I have found that the side plate forming part of this character of cover may be made of a plurality of parts in such a manner as to greatly reduce the cost of manufacture, eliminate waste of metal, and yet enhance the appearance of the cover.

In view of the foregoing, the objects of the invention include the provision of an improved side plate for a tire cover involving no waste of material, a simple method of manufacture, and by which the desired enhancement of the appearance of the cover as a whole is attained.

To these and other ends, a plurality of strips are made by rolling in the form of concentric annuli having overlapping marginal portions which are connected by lock seams.

Is is another object of the invention to construct a tire cover plate by an improved method which will permit of the application of a well defined coat of enamel or the like to a predetermined area of the plate without danger of contact between the enamel or the like with the rubber cushioning strip carried by the plate, to thereby prevent dissolution of the rubber by the enamel or the like.

Other and further important objects and advantages of this invention will be apparent from the disclosure in the specification and the accompanying drawing.

The invention (in a preferred form) is illustrated in the drawing and hereinafter more fully described.

On the drawing:

Figure 1 is a transverse view of a tire cover constructed in accordance with the present invention mounted thereon.

Figure 2 is an enlarged fragmentary sectional view showing the lock seam between adjacent portions of a multiple side plate made in accordance with the present invention, just prior to the operation by which they are locked.

Figure 3 is an enlarged fragmentary sectional view showing the same seam lock in its final state of completion.

Figure 4 is a fragmentary sectional view of a multiple part side plate construction embodying a somewhat modified form of lock seam.

Figure 5 is a fragmentary sectional view of another form of lock seam prior to completion thereof.

Figure 6 is an enlarged fragmentary sectional view showing the lock seam depicted in Figure 4 in its final stage of completion.

Figure 7 is a sectional view of a still further form of the invention.

Figure 8 is an enlarged fragmentary sectional view of the form of lock seam depicted in Figure 7 just prior to completion of the locking operation.

Figure 9 shows the same seam in the final stage of completion.

Figure 10 is an elevational view showing the circular form of each strip and the connection between its ends.

Figure 11 is an enlarged sectional view showing coatings on certain of the strips.

As shown on the drawing:

Referring now more particularly to the drawing, wherein the same parts are indicated throughout by the same reference characters, the tire cover constructed in accordance with the present invention comprises an outer ring or rim 1 in overlapping relation to multi-part side plate 2, the latter comprising preferably outer marginal portions 3 and 3a of chrome finish, stainless steel or the like, and a central portion or strip 4 which is preferably enameled or lacquered in black or a color harmonizing with the body finish of the vehicle in connection with which it is to be used.

Side plates of this character have formerly been stamped as a single piece from a square piece of sheet metal, and it is obvious that a large amount of waste has been incurred. I have found that by making the side plate of a plurality of strips, the latter are sufficiently narrow to permit of their being rolled into form instead of requiring a stamping operation from a large sheet of metal, and these strips can be made concentric and spot-welded at their ends and interlocked in a suitable fashion to thereby provide a complete side plate without waste of material.

As heretofore mentioned, it is desirable to finish the marginal portions of the side plate so that they will contrast with the central portion and thereby enhance the attractiveness of the plate as a whole. Inasmuch as the side plate carries a cushioning strip or bead 5 by which rattling between the parts 1 and 2 of the tire cover is eliminated, the problem of applying the enamel or lacquer to the portion 4 of the side plate is a serious one since the rubber is deteriorated to some extent by the moist enamel or the like. It is desirable to secure the bead 5 in place before the strips of the plate are finally assembled, so that the strip 4 may be separately enameled or otherwise coated, and when the coating dries the strip 4 may be secured to the other strip or strips of the side plate by lock seams or other suitable means. In addition, these covers are sold in large quantities by their manufacturer to automobile manufacturers, and the portion 4 is given merely a primer coat by the cover manufacturer to prepare the same for the shade of enamel or the like with which the automobile manufacturer desires to coat the same to harmonize with the particular colors of automobiles in connection with which he desires to use these covers. Since only the tire cover manufacturer is equipped with instrumentalities for connecting the bead 5 in position, I have devised a form of side plate construction by which the portion 4 may be enameled or otherwise coated by the automobile manufacturer and subsequently the parts may be interlocked by him to form the completed side plate.

To the above end, in accordance with one form of the invention, the outer strip 3 has its inner marginal portion bent back upon itself at 6 and then transversely at 7, the inner surface 8 of the portion 7 being such as to permit the outer peripheral edge 9 to slide into the position shown in Figure 2. It will be noted that each marginal portion of the strip 4 is return bent at 10, and is of a length such that when the portion 7 is bent downwardly to clinch the parts firmly together in the position shown in Figure 3, the extreme edges 11 and 12 will be substantially flush. It will be understood, of course, that the innermost marginal strip 3a and the inner marginal portion of the strip 4 will be correspondingly formed.

In the form of the invention shown in Figures 4, 5 and 6, the strip 4 is return bent at 13 and then extends laterally at 14 and the outermost strip 3 is so dimentioned that its inner edge 15 will just fit over the outer surface 16 of the portion 14. After the parts are positioned as shown in Figure 5, the portion 14 is again bent to the position shown in Figure 6 and the parts crimped or clinched in locking relationship.

In the form of the invention shown in Figures 7, 8 and 9, the cooperating marginal portions of the strips 3 and 4 are bent to form portions 17 and 18 which are substantially semi-circular in cross-section and provided with cooperating edges 19 and 20 of such radii as to permit relative axial movement of the strips 3 and 4. From the arrangement shown in Figure 8, the parts are crimped or clinched into the interlocking relationship shown in Figure 9.

The method of making the side plates is carried out as follows:

The innermost strip such as the strip 3a is preferably return bent at its inner periphery 3b to provide a smooth edge, and the inner periphery of the strip 4 may also be rebent as at 4b.

Each strip may be originally straight, for example, and is shaped as by a rolling operation into a transversely arcuate circular form with its ends preferably overlapped as shown in Figure 10. The ends are united as by spot- or other welding as indicated by the center-line 21.

The strips 3 and 3a are formed with their juxtaposed marginal portions as shown in Figures 2, 5 or 8, and the marginal portions of the intermediate strip 4 are also formed as shown in said figures, whereby the parts may be assembled in position preparatory to receiving the final lock seams as a result of which the parts are to be connected as shown respectively in Figures 3, 6 and 9. With the cushioning bead 5 secured in position in the strip 3 as by crimping or clinching as shown, the strips 3 and 3a chrome plated as at 3c (provided they are not made of stainless steel or the like), and the outer surface of the center strip 4 either uncoated or provided with a primer coat as at 4c, the three strips are sent in their knock-down shape to the automobile manufacturer, who applies a coat of enamel or the like of the desired shade to the outer surface of the strip 4. He then positions the marginal portions of the various strips as indicated in Figures 2, 5, and 8 and thereupon lock seams the parts to form the finished side plate. There is thus no danger of the moist enamel or lacquer or the like contacting the rubber strip 5, so that deterioration of the strip by the enamel or the like is prevented.

It will be understood, of course, that the manufacturer of the tire cover may perform all the operations necessary to the construction of the side plate, that is, in addition to forming the strips 3 and 3a with the rubber or cushioning bead 5 secured to the strip 3, the tire cover manufacturer may also apply the desired coat of enamel or the like to the outer surface of the strip 4, and after this coat dries, he may himself perform the lock seam operation by which the tire cover plate is entirely completed.

It is to be appreciated, of course, that, if desired, the side plate may consist of only the strips 3 and 4, and the strips may be stamped out of a square sheet as heretofore, or may be rolled into zones and welded as herein mentioned.

The strips could be connected together in their flat condition, and the resulting composite plate subjected to a rolling or similar operation to impart a concavo-convex form in cross section to the plate so that it will properly engage and cover a side wall of the tire. Or, if desired, the individual strips could be initially formed for this purpose prior to their interconnection.

The various operations such as crimping, clinching, lock-seaming, rolling, welding, painting, plating and the like employed in the practice of the invention may be of any character well known to those skilled in the art.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of constructing a tire cover side plate having a cushioning bead of rubber and provided with a protective coat without subjecting the rubber to deterioration by said coat, which comprises forming a plurality of circular strips, securing a rubber bead to a marginal edge of one of said strips, applying a protective coat to the other of said strips, and interlocking said other strip with the second marginal edge of the first strip.

2. The method of forming a tire cover side plate which comprises forming a circular strip of steel, securing a cushioning strip of rubber to the outer margin of said strip, forming a second strip in the shape of a circle, with its outer marginal edge adapted for arrangement in overlapped relation to the inner marginal edge of the first strip, applying a protective coat to a surface of the second strip and allowing the same to dry, bending one of said edges to form a rabbet, fitting the other of said edges into said rabbet, and bending a wall of said rabbet toward the other to tightly crimp the other edge between the walls of the rabbet.

3. The method of forming a side plate of a tire cover comprising the steps of forming a plurality of strips of metal into circular zones so that the outer margin of one strip is adapted for overlapping the inner margin of the other strip, securing a rubber cushioning bead to one of the strips, applying a protective coating to the other strip, and subsequently interlocking said margins.

4. The method of forming a tire cover member which consists in forming separate strips into ring-like elements, providing the outer and exposed surface of each element with a finish different from that applied to the other element, and then lock seaming adjoining marginal edges of said elements so as to form a composite cover member applicable as a unit to a spare tire.

5. The method of forming a tire cover member which consists in forming separate strips into ring-like elements, providing the outer and exposed surface of each element with a finish different from that applied to the other element, lock seaming adjoining marginal edges of said elements so as to form a composite cover piece applicable as a unit to a spare tire, providing the opposite edge of one element with a cushioning bead and rolling back the opposite edge of the other element to provide this other element with a turned edge.

GEORGE ALBERT LYON.